(12) United States Patent
Gupta et al.

(10) Patent No.: US 12,400,222 B2
(45) Date of Patent: Aug. 26, 2025

(54) DECENTRALIZED PLATFORM FOR B2B COLLABORATION IN B2C MODEL USING COLLABORATIVE DIFFERENTIATED VALUE (CDV) TOKENS

(71) Applicant: Hughes Systique Private Limited, Haryana (IN)

(72) Inventors: Amit Gupta, Delhi (IN); Sushant Jain, Delhi (IN)

(73) Assignee: Hughes Systique Private Limited, Haryana (IN)

( * ) Notice: Subject to any disclaimer, the term of this patent is extended or adjusted under 35 U.S.C. 154(b) by 60 days.

(21) Appl. No.: 18/386,718

(22) Filed: Nov. 3, 2023

(65) Prior Publication Data
US 2024/0420123 A1 Dec. 19, 2024

(51) Int. Cl.
G06Q 20/38 (2012.01)
G06Q 20/32 (2012.01)
G06Q 20/40 (2012.01)

(52) U.S. Cl.
CPC ... *G06Q 20/38215* (2013.01); *G06Q 20/3227* (2013.01); *G06Q 20/409* (2013.01)

(58) Field of Classification Search
None
See application file for complete search history.

(56) References Cited

U.S. PATENT DOCUMENTS

| 8,626,593 B2 * | 1/2014 | Goldfinger | G06Q 20/20 705/21 |
| 10,909,529 B2 * | 2/2021 | Ortiz | G06F 21/62 |
| 2014/0100931 A1 * | 4/2014 | Sanchez | H04L 63/083 705/40 |
| 2021/0142314 A1 * | 5/2021 | Pharr | G07F 19/20 |
| 2025/0029137 A1 * | 1/2025 | Ramde | G06Q 30/0645 |

FOREIGN PATENT DOCUMENTS

IN 3863MU2015 A * 4/2017 ............. G06Q 30/00

* cited by examiner

*Primary Examiner* — Paul S Schwarzenberg
(74) *Attorney, Agent, or Firm* — Nath, Goldberg & Meyer; Joshua B. Goldberg

(57) ABSTRACT

A decentralized system comprises enterprises, a decentralized blockchain platform, smart contracts, and a mobile device. The enterprises are onboarded onto the decentralized blockchain platform and are provided with credit points for the consumers. Each enterprise registers on the decentralized blockchain platform using a smart contract including rules. User performs transactions with the enterprises and the credit points are computed based on the smart contract. An issuing enterprise transfers credit tokens to a blockchain account that is generated for the consumer, and the credit tokens are redeemable at a redeeming enterprise. A mobile application of the consumer authenticates a transaction at the redeeming enterprise. The redeeming enterprise provides a quick reference code, which the consumer scans using the mobile application and authenticates the transaction. The redemption is then exchanged for a differentiated value based on the smart contracts of the issuing enterprise and the redeeming enterprise.

9 Claims, 8 Drawing Sheets

DECENTRALIZED PLATFORM FOR B2B COLLABORATION IN B2C MODEL USING COLLABORATIVE DIFFERENTIATED VALUE (CDV) TOKENS

TECHNICAL FIELD

The present invention relates to a blockchain decentralized architecture-based credit system that enables enterprises to seamlessly collaborate, and exchange issued credits without closely integrated transactional and technical systems.

BACKGROUND

Background description includes information that may be useful in understanding the present invention. It is not an admission that any of the information provided herein is prior art or relevant to the presently disclosed invention, or that any publication specifically or implicitly referenced is prior art.

Enterprises work assertively to build long-term associations and fulfil consumer needs independently. In real-life scenarios, consumers work with numerous enterprises for differing and similar needs. Consumers earn credits as they transact with the enterprises and these credits are the primary conclusion of the transaction. For example, in an educational system, students earn credit for every completed course, or could be a secondary outcome offered to consumers to encourage repeat transactions, such as loyalty points offered in the retail, hospitality industry. The present credit earning and redeeming systems have limited scope of either the rewarding enterprise or a small consortium formed by enterprise by coming together and defining a unified credit system. For example, credit earned by a student on a college course can be used only in that university for a degree qualification or a consortium of predefined colleges and similarly for loyalty points issued by retailers. This limited applicability of the earned credits is a major restriction for consumers to effectively use them, and over time, consumers start losing interest in the credit programs due to multiple reasons. These reasons include:

The consumers get enrolled in multiple programs and keeping a track of all the enrolled entities becomes challenging. This eventually results in churn.

Consumers are not able to cross the minimum threshold of points before they start receiving the benefits, which makes them feel more bonded by a given program than a value proposition.

Consortium approach answers the above concerns in a limited fashion due to the small size of the consortiums, and far from the flexibility expected from the consumer.

However, the consortium approach is not scalable due to:

Consortiums are either structured to have a shared and common credit system. This needs a strong relationship and a level playing field among all consortium members, and Another strategy is for each enterprise to have its own credit system like a single entity system, but the earned credits can be used at the issuing enterprise kiosk only even for consuming other enterprise services. Enterprises need to have their backend connected and communicate among themselves to transfer credit in such scenarios.

Furthermore, Blockchain-based credit programs are gaining attraction and a lot of research is happening in this area.

Most of the blockchain-based credit programs work by giving nonfungible tokens to the consumer, these NFTs could be used by customers as proof of ownership, as collectibles, for access to premium services or discounts, etc. For example, NFT could be used as proof of a student has completed a specific course and earned associated credits or could be a pass to premium/preferential services or could be direct monetary benefits. However, existing Blockchain credit programs solve certain aspects of both customer and enterprise challenges, but they do not answer the bigger issues like:

Blockchain credit system helps customers to manage/track multiple accounts in a centralized crypto wallet, they do not solve the bigger issue of customers effectively using the earn credits across enterprises in an accumulated fashion at their next transaction enterprise kiosk seamlessly, and For Enterprises, though blockchain solves technological issues for enterprises to connect due to its decentralized, zero trust characteristics, it does not answer the core issue of the issue of competing and nonrelated companies coming together and still solving the cannibalization issue.

Therefore, there is a need for a blockchain decentralized architecture-based credit system that enables enterprises to seamlessly collaborate, and exchange issued credits without closely integrated transactional and technical systems.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

As used herein, the term "Transaction" refers to a process or event where there is an opportunity to earn or redeem the earned credit with an Enterprise. It involves a series of actions or steps that occur to complete the process. Examples of the transaction include students completing a course to earn credit, redeeming earned credit to earn a degree, consumer earning and redeeming credit during purchase/sales process, etc.

As used herein, the term "Exchange" refers to an act/process of conversion of one enterprise credit point into monetary value or benefits at the same or another enterprise using a regulated and transparent environment.

A blockchain decentralized architecture-based credit system is disclosed here that enables enterprises to seamlessly collaborate and exchange issued credits without closely integrated transactional and technical systems.

This system also enables enterprises to:

Transact their issued credits to another enterprise at a differentiated value based on the relationship between issuing and redeeming enterprise. This differentiated value credit system allows the enterprise to work as per its transactional ecosystem and do the requisite conversion based on issuing and redeeming enterprise relations.

Consumers can seamlessly redeem the accumulated credit at the kiosk of the redemption enterprise, which is a logical destination for redemption instead of redeeming at issuing enterprise kiosks.

As used herein, a "Blockchain" in this context, is primarily a DLT (Distributed Ledger Technology) that is immutable, secure, decentralized, and has distributed storage. The decentralized mechanism of blockchain ensures that the decision is taken based on a consensus mechanism and not by any centralized authority. As used herein, "Web3" is the access layer of the blockchain platform that is used to create decentralized applications (Dapps). In earlier versions of the Web, user data and policies were owned by centralized authorities. However, in the Web3 ecosystem, ownership of the data, system rules, and decision-making is owned by the system participants/users instead of a central authority.

As used herein, a "smart contract" is a programming code that resides in the blockchain and is automatically executed in a safe manner when certain contracted conditions are met. The smart contract is the backend of the Web3 based Dapps (Distributed Apps). It is used to automate the execution of an agreement so that the participating entities can be immediately certain of the outcome, without any intermediary's involvement. The smart contracts have the transactional logic that is invoked by the Web3-based interfaces and executes the transactions on the blockchain. In the Blockchain ecosystem, a token can represent anything like reputation points, skill in the game, tickets, digital collectibles, etc. to a cryptocurrency. The token can be a fungible or nonfungible token.

Fungible Token: Fungible tokens have the property that every token is the same as another token like currency. As an example, every 1 USD currency is the same as another currency of the same denomination. ERC-20 defines the standard for fungible tokens.

Non-Fungible Tokens: NFTs are tokens that are used to represent ownership of unique items. They are used to tokenize things like art, collectibles, services, etc.

A decentralized system for crediting and redemption of credit points using scannable codes is disclosed here. The decentralized system comprises at least one processor that operates under control of a stored program comprising a sequence of program instructions to control one or more components. The components comprise multiple enterprises, a blockchain platform, smart contracts, and a mobile device. As used herein, the "blockchain platform" is also addressed as a decentralized blockchain platform, which is a network of nodes for maintaining transaction records, like a ledger. The enterprises are onboarded onto the decentralized blockchain platform and are provided with credit points that need to be shared with consumers. Each enterprise registers on the decentralized blockchain platform using a smart contract that includes a set of rules. The smart contract is part of a blockchain of the decentralized blockchain platform, which governs how the credits are monetized across different enterprises.

The user performs one or more transactions with one or more of the enterprises, and in response to the transaction, the processor computes the credit points based on the smart contract between consumer and the enterprise, which is an issuing enterprise. The issuing enterprise transfers the associated credit tokens to a blockchain account that is generated for the consumer, wherein the credit tokens are redeemable at a redeeming enterprise. The mobile device comprises a mobile application that is used by the consumer, where the consumer uses the mobile application to authenticate a transaction at the redeeming enterprise, and the consumer is enrolled in a credit program. The redeeming enterprise provides a quick reference (QR) code, which the consumer scans using the mobile application and authenticates the transaction. The redemption is then exchanged for a differentiated value based on the smart contracts of the issuing enterprise and the redeeming enterprise.

In an embodiment, the enterprises mine a pool of associated credit tokens, which are non-fungible credit tokens to be granted as credit points to the consumers, and the set of rules defined in the smart contract governs how the credits are monetized across the different enterprises. In an embodiment, the credit points are non-fungible credit tokens that are different from cryptocurrencies, which are exchanged at a fixed price, irrespective of any trading platform or a location of exchange. In an embodiment, value of the non-fungible credit tokens is determined by the smart contract based on two entities involved in the transaction, wherein the two entities comprise a first entity and a second entity. The first entity, which is the issuing enterprise mines the non-fungible credit tokens and issues the non-fungible credit tokens to the consumers. The second entity, which is the redeeming enterprise, wherein the consumer redeems the fungible credit tokens as credit points.

In an embodiment, the smart contract facilitates earning and redeeming of the credit points, and enable the credits consumption across different enterprises, without any explicit credit points exchange, wherein the smart contract is a combination of instructions and rules defining credit points conversion, wherein each onboarded enterprise defines and changes their conversion rules respectively, wherein one enterprise is enabled to define the differentiated value based on strategy, positioning, and mutual agreement with other enterprises that are onboarded onto the decentralized blockchain platform, and wherein the enterprises define a non-reciprocal conversion rate.

In an embodiment, as a part of the enrolment process of the consumer, a blockchain account is created in the decentralized blockchain platform for the consumer, and public and private keys of their blockchain account is shared with the consumer, wherein the decentralized blockchain platform maintains mapping of a consumer ID that is associated with the blockchain account, with the public key generated based on the consumer account in the blockchain. In an embodiment, when the consumer transacts for credit redemption, the consumer needs to authenticate the transaction using their public and private key for account security using the mobile application. In an embodiment, the redeeming enterprise comprises a kiosk, wherein the kiosk displays the QR code, which is a dynamic QR code, and the consumer scans the dynamic QR code using the mobile application on their mobile device and authenticates the transaction.

These and other objects, embodiments and advantages of the present invention will become readily apparent to those skilled in the art from the following detailed description of the embodiments having reference to the attached figures, the invention not being limited to any particular embodiments disclosed.

BRIEF DESCRIPTION OF FIGURES

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting its scope, for the subject matter may admit to other equally effective embodiments.

DETAILED DESCRIPTION

Figure 1:
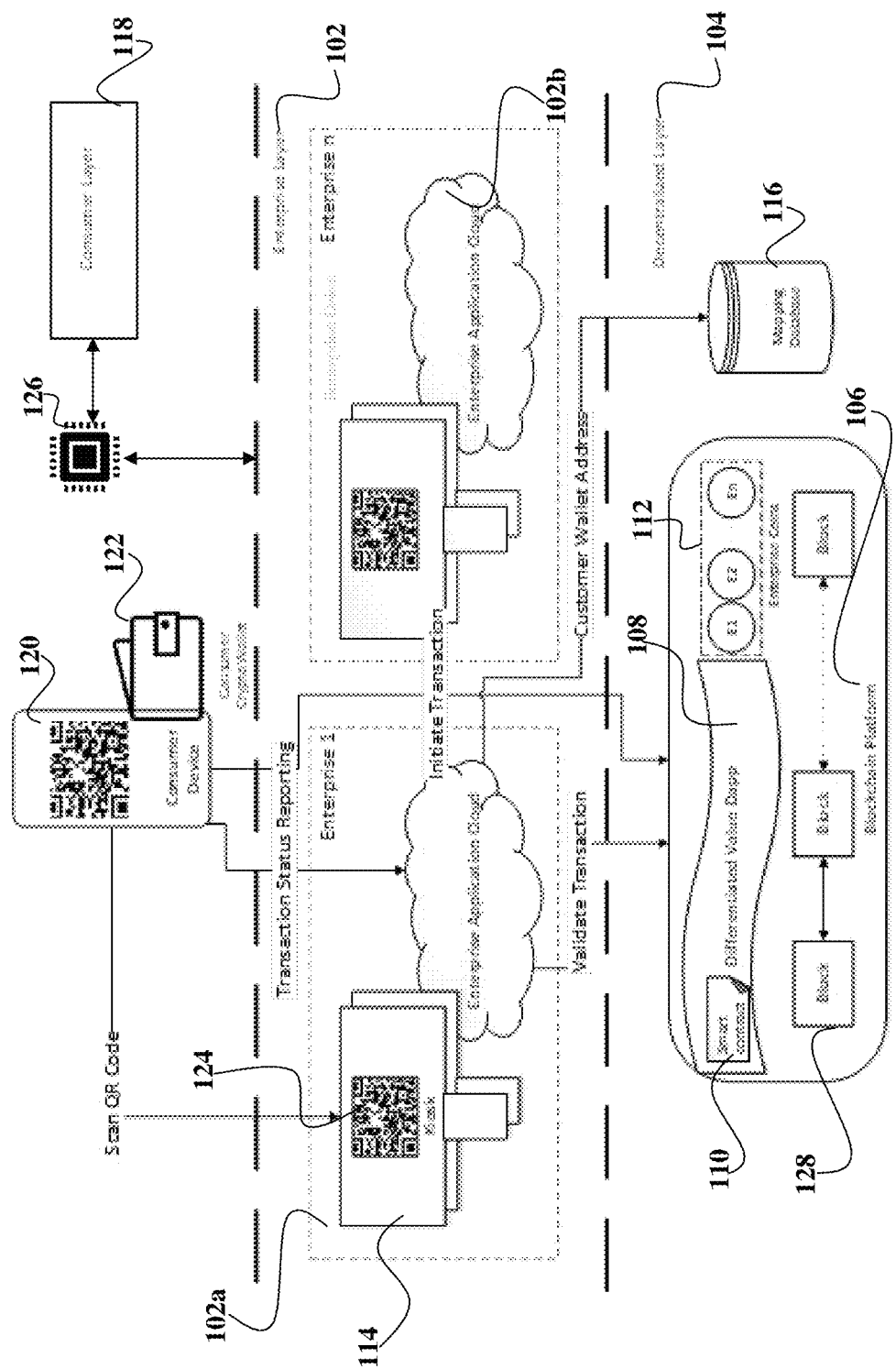
FIG. 1 exemplarily illustrates a schematic system diagram showing a decentralized system for crediting and redemption of credit points using scannable codes, as an embodiment of the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and transaction-related constraints, which will vary from one implementation to another. Moreover, it will be appreciated that such a development effort, even if complex and time-consuming, would be a routine undertaking for those of ordinary skill in the art having the benefit of this disclosure.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals used herein illustrate only typical embodiments of the present subject matter, and are therefore, not to be considered for limiting its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skills in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

Glossary of components described in this application:

| S. No. | Item | Physical reference | Reasoning |
| --- | --- | --- | --- |
| 1 | ERC20 Token | Coins | Each ERC20 token in this solution maps with a currency mapped to an Enterprise |
| 2 | QR Code | QR Code | |
| 3 | Kiosk/PoS | Physical Kiosk | |
| 4 | Consumer Device | Mobile/smart Phone | |
| 5 | Consumer Wallet | Wallet | Wallet to keep different currency ERC20 tokens |
| 6 | Enterprise App Cloud | Enterprise Datacentre | Data-centre hosting enterprise specific applications |
| 7 | Differentiated Value Dapp (including smart Contract) | Exchange with a set of rules for currency/token exchange. For example, similar to a power rectifier/transformer to convert one ERC20 token into another token/value. | |
| 8 | Enterprise Wallet | Bank Locker | Holding all the ERC20 tokens for the enterprise self and exchanged. |

| S. No. | Item | Physical reference | Reasoning |
| --- | --- | --- | --- |
| 9 | Blockchain | Network of storage nodes for ledger | Network of nodes for maintaining transaction records like a ledger |
| 10 | Mapping Database | Storage Cloud | |
| 11 | Enterprise cloud URL | Address of the enterprise data centre for a given function/purpose. | |
| 12 | Credits redeemed and associated Value | No. of ERC20 tokens exchanged for the given associated tangible benefit (money, education credit etc). | |

FIG. 1 exemplarily illustrates a schematic system diagram showing a decentralized system 100 for crediting and redemption of credit points using scannable codes, as an embodiment of the present disclosure. The decentralized system 100, or in other words, the collaborative enterprise to enterprise platform for the customer credit trading ecosystem consists of the 3 layers, glued together by tokenizing the consumer's earned credit as "Collaborative Differentiated Value" (CDV) Tokens. Each enterprise 102 of the enterprise layer 102 has its own CDV token 112 like CDV-E1 for Enterprise 1, CDV-E2 for Enterprise 2, and so on. Though each enterprise 102 has its proprietary token, these tokens are collaborative and get converted to an adaptive differentiated value based on the awarding enterprise transactional strategy for consuming enterprise by Differentiated Value Dapp 108 using a set of smart contracts 110.

The decentralized layer 104 is the main Decentralized blockchain platform 106 along with the proposed "Differentiated Value" web3 decentralized application (Dapp) 108, set of smart contracts 110, and individual CDV tokens 112 for each onboarded enterprise 102. Any enterprise on onboarding this Decentralized blockchain platform 106 mines its specific CDV tokens 112, which gives them the independence to define its own transactional rules and criteria for credit reward. The CDV tokens 112 are converted to a value at the redemption enterprise using the set of Differentiated Value Dapp smart contracts 110, defining the combination of rules and instructions to seamlessly exchange any enterprise CDV tokens 112 at any other enterprise trading kiosk 114. The mapping database 116 is a central data repository mapping the customer ID, with their account address to transfer credit. This mapping data repository avoids the complication of customers sharing their account address every time for credit award workflow also.

Furthermore, the enterprise layer 102 is the combination of enterprise application suites, trading kiosks 114, and related applications. Each enterprise 102 will have its own independent application suite and doesn't need any integration with partner enterprises, even though they are seamlessly accepting the CDV tokens 112 issued by each other. This total independent technical solution, with the flexibility of defining their own custom logic for differentiated value computation gives the flexibility to scale the credit consortium without any friction at the technology and transactional level.

The consumer layer ecosystem 118 consists of a web3 application on the customer's smartphone or mobile device 120 and an associated crypto wallet 122. This web application acts as a customer's authorization mechanism to authorize the credit redemption request when initiated by an enterprise kiosk 114. This web3 application is linked with the customer crypto wallet 122 for accessing the relevant private and public keys of the customer blockchain account to initiate the request. The consumer has to scan the QR-Code presented by the Kiosk 114 in order to generate any credit redemption requests.

Figure 2:
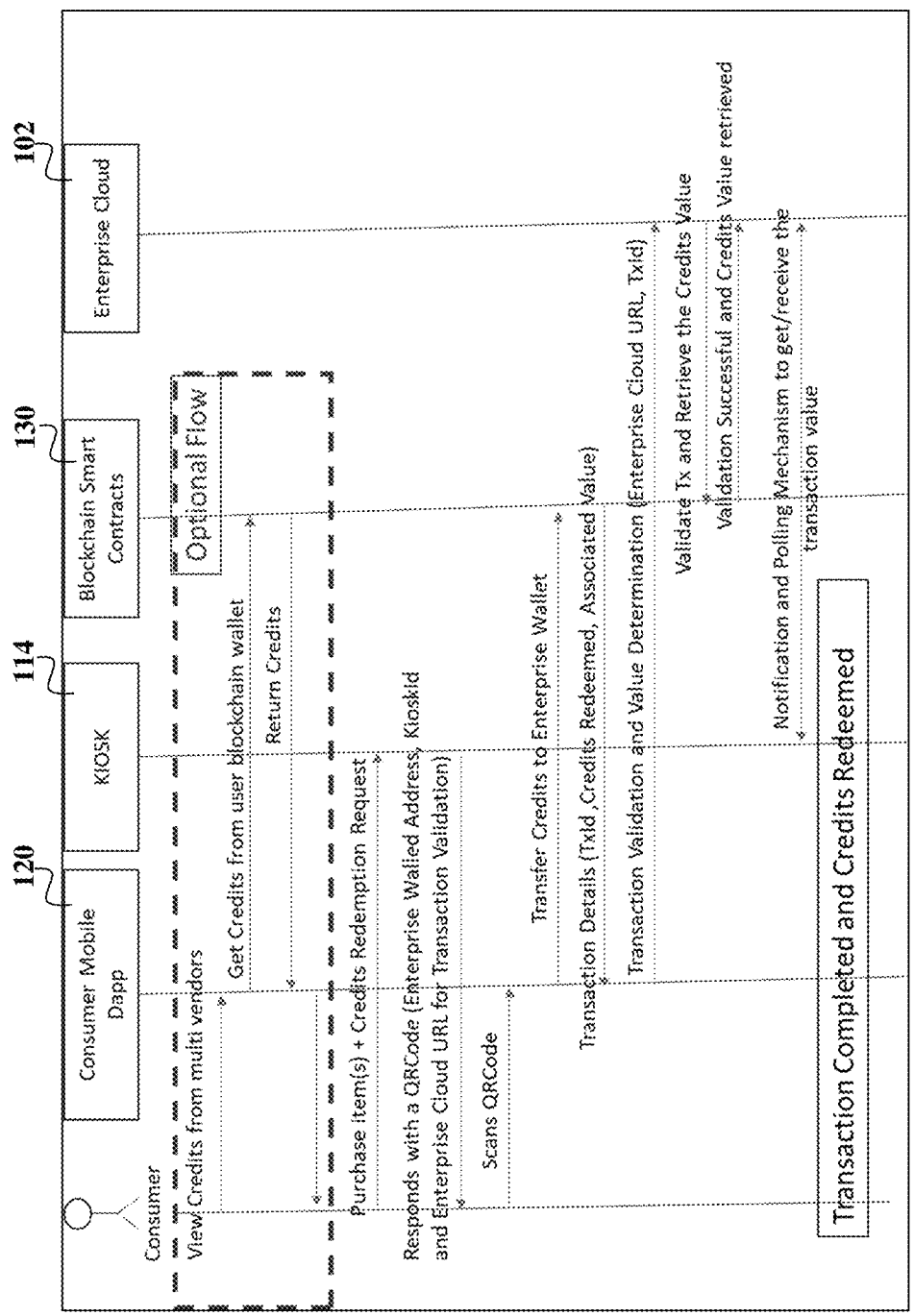
FIG. 2A exemplarily illustrates the workflow associated with the decentralized system for crediting and redemption of credit points using scannable codes as shown in FIG. 1, as an embodiment of the present disclosure.
FIG. 2B exemplarily illustrates the method flow associated with the decentralized system, as shown in FIG. 2A, as an embodiment of the present disclosure.
Figure 2B:
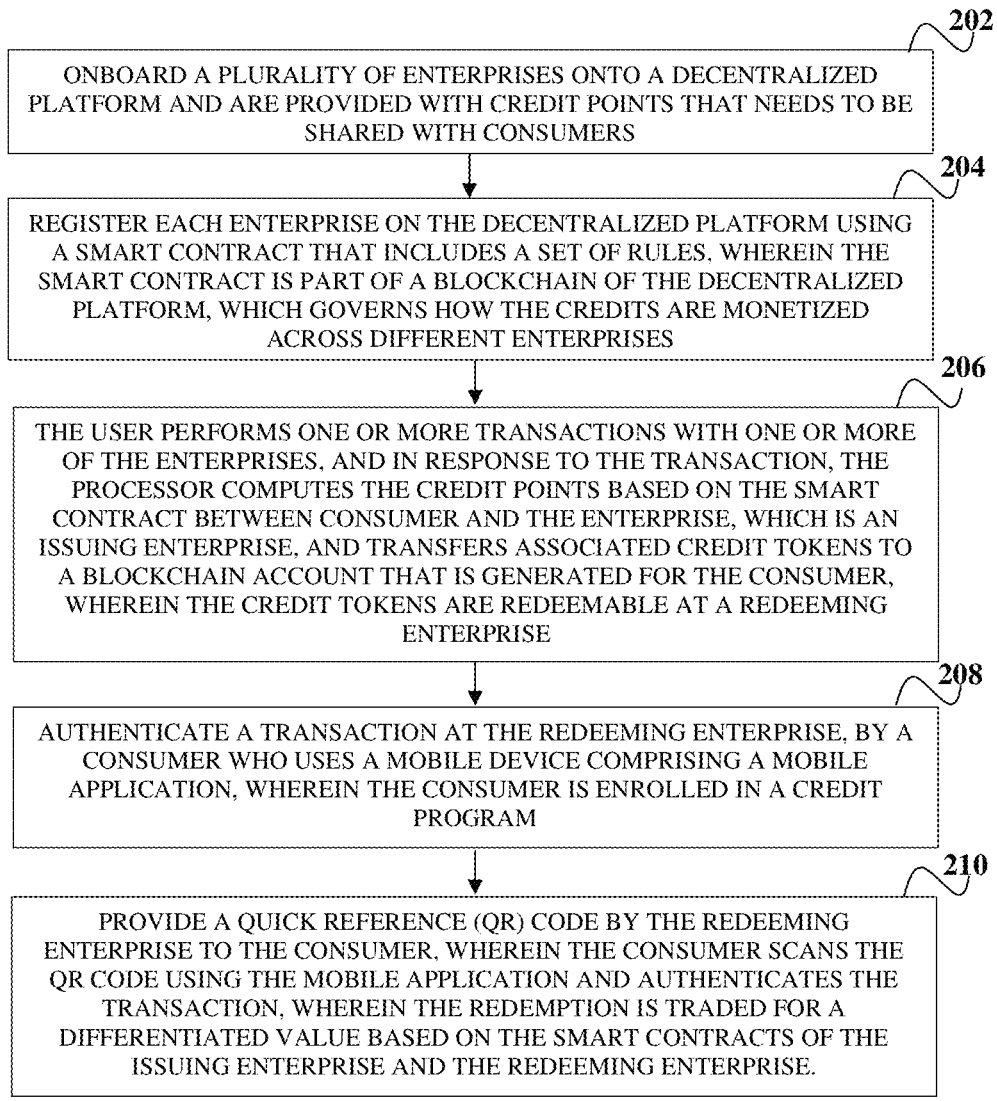

Referring to FIGS. 2A and 2B, FIG. 2A exemplarily illustrates the workflow associated with the decentralized system 100 for crediting and redemption of credit points using scannable codes as shown in FIG. 1, as an embodiment of the present disclosure. FIG. 2B exemplarily illustrates the method flow associated with the decentralized system 100, as shown in FIG. 2A, as an embodiment of the present disclosure. As disclosed in FIGS. 1 and 2A-2B, the decentralized system 100 for crediting and redemption of credit points using scannable codes (Or QR codes) 124, and the decentralized system 100 comprises at least one processor 126 that operates under control of a stored program comprising a sequence of program instructions to control one or more components. The components comprise multiple enterprises 102, a decentralized blockchain platform 106, smart contracts 110, and a mobile device 120. The enterprises 102 are onboarded 202 onto a decentralized blockchain platform 106 and are provided with credit points that need to be shared with consumers. Each enterprise 102 registers 204 on the decentralized blockchain platform 106 using the smart contract 110 that includes a set of rules. The smart contract 110 is part of a blockchain 128 of the decentralized blockchain platform 106, which governs how the credits are monetized across different enterprises 102.

The user performs 206 one or more transactions with one or more of the enterprises 102, and in response to the transaction, the processor 126 computes the credit points based on the smart contract 110 between consumer and the enterprise 102, which is an issuing enterprise 102a. The issuing enterprise 102a transfers the associated credit tokens 112 to a blockchain account that is generated for the consumer, wherein the credit tokens 112 are redeemable at a redeeming enterprise 102b. The mobile device 120 comprises a mobile application that is used by the consumer, where the consumer uses the mobile application to authenticate 208 a transaction at the redeeming enterprise 102b, and the consumer is enrolled in a credit program. The redeeming enterprise 102b provides 210 a quick reference (QR) code 124, which the consumer scans using the mobile application and authenticates the transaction. The redemption is then exchanged for a differentiated value based on the smart contracts 110 of the issuing enterprise 102a and the redeeming enterprise 102b.

The process flow is further elaborated as follows:
1. Enterprises are onboarded onto the decentralized blockchain platform 106 using a defined workflow. As an onboarding process:
   a. As a first step, enterprises 102 define their metadata using a predefined template, which mainly consists of characteristics like enterprise name, segment, size, revenue, geography, etc. This information is persisted in the blockchain 128 using differentiated value Dapp enterprise management smart contract 110.
   b. In an embodiment, the enterprises 102 mine a pool of associated credit tokens 112, which are non-fungible credit tokens to be granted as credit points to the consumers, and the set of rules defined in the smart contract 110 governs how the credits are monetized across the different enterprises 102. In other words, once the enterprise meta data is saved, an enterprise specific CDV token 112 is created for this onboarded enterprise. These CDV tokens 112 are ERC20 NFT tokens, which are mined as part of the onboarding process and saved in the blockchain account of the enterprise to be granted as rewards/grants to the consumers.

c. Enterprise 102 defines the set of rules, logic, which govern how these rewards are used/monetized across different enterprises 102, based on their transactional relationships.

2. In an embodiment, the credit points are non-fungible credit tokens 112 that are different from cryptocurrencies, which are exchanged at a fixed price, irrespective of any trading platform or a location of exchange. These CDV tokens 112 are different from typical cryptocurrencies, which are exchanged on the public platform at a fixed price, irrespective of the trading platform.

3. The value of these CDV tokens 112 is determined by the chain of smart contract 110, coded as Differentiated value Dapp 108 based on the two entities involved in the transaction:
   a. First entity is the issuing enterprise 102a, which has mined the CDV tokens 112 and further issued the non-fungible credit tokens (or CDV tokens 112) to the consumers, and
   b. The second entity, which is the redeeming enterprise 102b, wherein the consumer redeems the fungible credit tokens (CDV tokens 112) as credit points.

4. This governance model enables the "Token Issuers" to define rules to enable the redemption/utilization of these tokens at a differentiated value based on the consuming enterprise. These rules are enforced by the smart contract during transaction execution.

5. In an embodiment, the smart contract 110 facilitates earning and redeeming of the credit points, and enables the credits consumption across different enterprises 102, without any explicit credit points exchange. The smart contract 110 is a combination of instructions and rules defining credit points conversion, where each onboarded enterprise 102 defines and changes their conversion rules respectively. One enterprise 102 is enabled to define the differentiated value based on strategy, positioning, and mutual agreement with other enterprises 102 that are onboarded onto the decentralized blockchain platform 106, and wherein the enterprises define a non-reciprocal conversion rate.

In other words, the smart contract 110 is responsible for these rewards earning and redemption seamlessly enables the rewards consumption across different enterprises 102, without any explicit reward points exchange.

a. Smart contract 110 is the combination of the instructions and rules defining credit points conversion. Each onboarded vendor will have access to define and change their conversion rules only. Vendors can define this conversion ratio based on their transactional strategy, positioning, and mutual agreement with other vendors.

b. This seamless exchange enables enterprises 102 to have a nonreciprocal conversion rate, i.e., enterprise 1 reward monetization at enterprise 2 and enterprise 2 reward monetization at enterprise 1 may not be in sync based on their strategy and could be totally independently defined by them using their own rules.

6. Consumers will have CDV tokens 112 issued by all the enterprises 102 in their single account.

7. In an embodiment, as a part of the enrolment process of the consumer, a blockchain account is created in the decentralized blockchain platform 106 for the consumer, and public and private keys of their blockchain account is shared with the consumer, wherein the decentralized blockchain platform 106 maintains mapping of a consumer ID that is associated with the blockchain account, with the public key generated based on the consumer account in the blockchain.

When a customer transacts for the first time at any participating enterprise 102, the customer gets enrolled in the credit program. As part of the enrolment process, the customer account is created in the baseline blockchain credit platform, and its public and private keys are shared with the customer. This credit platform also maintains the mapping of customer ID with the blockchain account public key. When a customer transacts with an enterprise triggering credit earning, the decentralized system 100 computes the credit points based on the transactional logic and transfers the associated credit point ERC20 tokens to the customer blockchain account. The decentralized system 100 fetches the customer blockchain account public key from the mapping database 116 and transfers requisite tokens to the customer account.

8. In an embodiment, when the consumer transacts for credit redemption, the consumer needs to authenticate the transaction using their public and private key for account security using the mobile application. In other words, when a customer transacts for reward redemption, the customer needs to authenticate the transaction using their public and private key for account security. The enterprise redemption terminal device will display the dynamic QR code 124, the customer scans the dynamic QR code 124 using the credit application on their smartphone 120 and authenticates the transaction. The redemption is exchanged using the logic as explained in step 5, for differentiated value based on the issuing and logic of the redeeming enterprise 102b.

9. In an embodiment, the redeeming enterprise 102b comprises a kiosk 114, wherein the kiosk 114 displays the QR code 124, which is a dynamic QR code 124, and the consumer scans the dynamic QR code 124 using the mobile application on their mobile device 120 and authenticates the transaction. The Dynamic QR code 124 generated at the Kiosk 114 embeds:
   a. Enterprise ID and Wallet Address,
   b. Kiosk ID,
   c. Details about the current transaction, which governs the rules for possible and maximum redemption, and
   d. Enterprise cloud URL to confirm transaction ID and its status.

Figure 3:
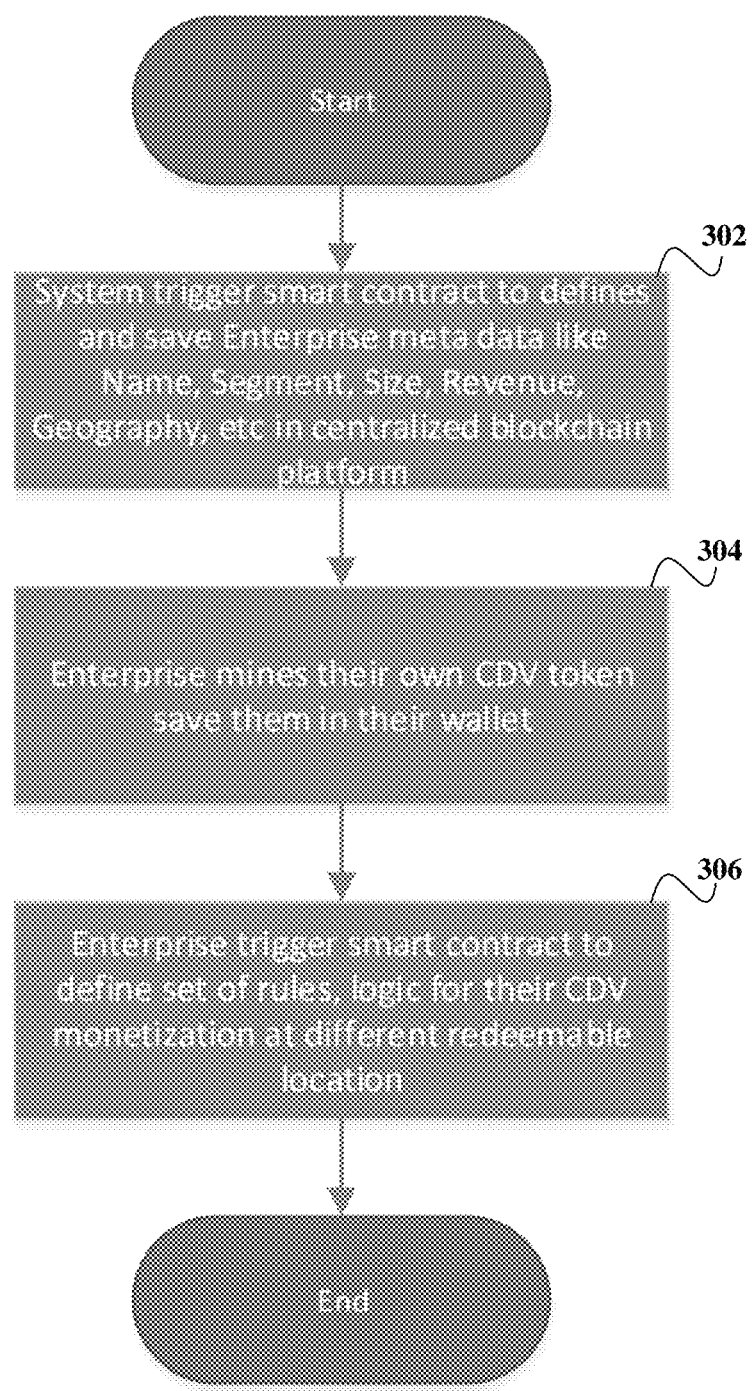
FIG. 3 exemplarily illustrates the onboarding process associated with the decentralized system for crediting and redemption of credit points using scannable codes as shown in FIG. 1, as an embodiment of the present disclosure.

FIG. 3 exemplarily illustrates the onboarding process associated with the decentralized system 100 for crediting and redemption of credit points using scannable codes as shown in FIG. 1, as an embodiment of the present disclosure. In the first step 302, the decentralized system 100 triggers smart contract 110 to define and save enterprise meta data like name, segment, size, revenue, geography, etc., in the decentralized blockchain platform 106. At 304, enterprise 102 mines their own CDV token 112 and saves these tokens in their wallet 122. Furthermore, at 304, the enterprise 102 triggers smart contract 110 to define set of rules, logic for their CDV monetization at different redeemable location.

Figure 4A:
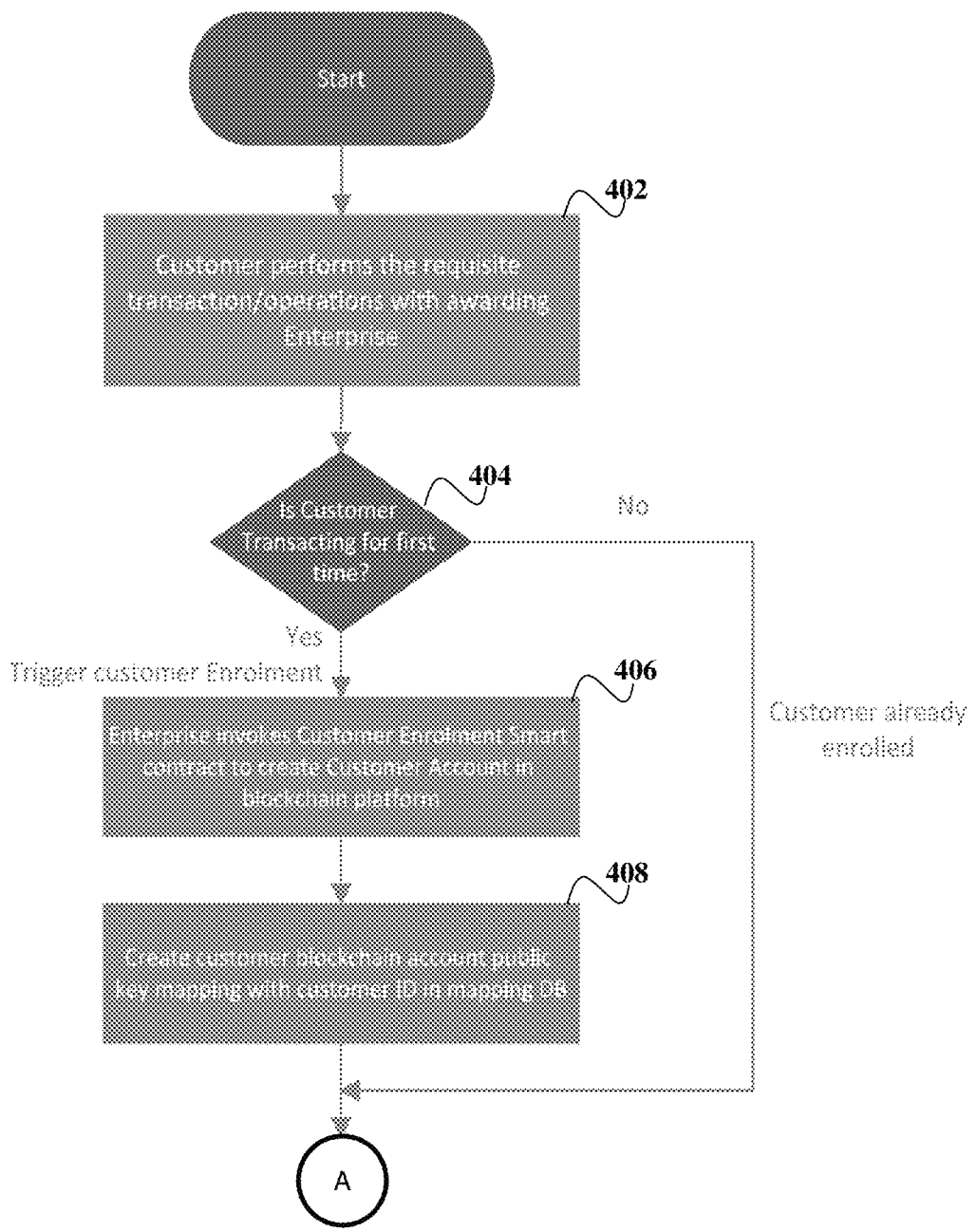
FIGS. 4A and 4B exemplarily illustrate the awarding of collaborative differentiated value (CDV) tokens associated with the decentralized system for crediting and redemption of credit points using scannable codes, as an embodiment of the present disclosure.
Figure 4B:
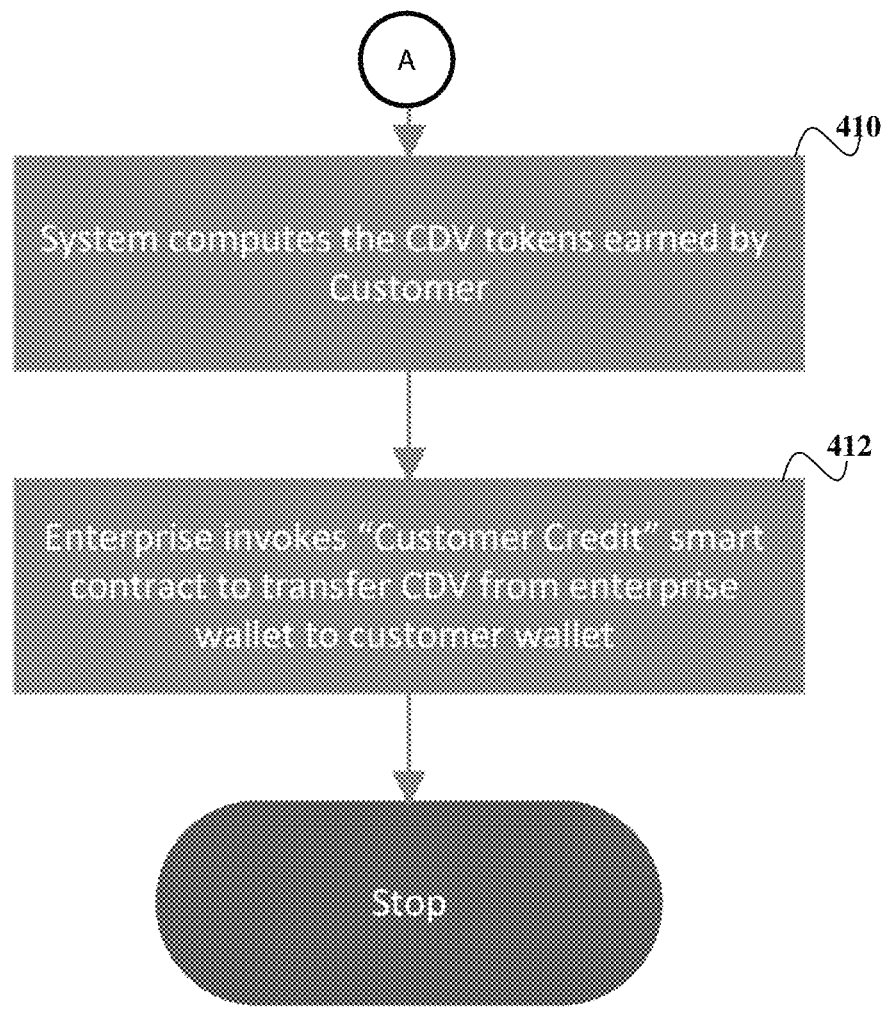

FIGS. 4A and 4B exemplarily illustrate the awarding of collaborative differentiated value (CDV) tokens 112 associated with the decentralized system 100 for crediting and redemption of credit points using scannable codes, as an embodiment of the present disclosure. At 402, the customer performs the requisite transaction/operations with awarding enterprise 102. At 404, a check is performed whether the customer is transacting for first time ?. At 406, if its YES and the customer is indeed transacting for the first time, then enterprise 102 invokes customer enrolment smart contract 110 to create customer account in decentralized blockchain platform 106. At 408, a customer blockchain account is created with a public key mapping with customer ID in mapping database 116. At 410, the decentralized system 100 computes the CDV tokens 112 earned by customer. At 412, the enterprise 102 invokes "Customer Credit" smart contract 110 to transfer CDV from enterprise wallet to customer wallet 122. In another instance, if the customer is NOT transacting for the first time, then the subsequent steps are bypassed and at 410, the decentralized system 100 computes the CDV tokens 112 earned by customer.

Figure 5A:
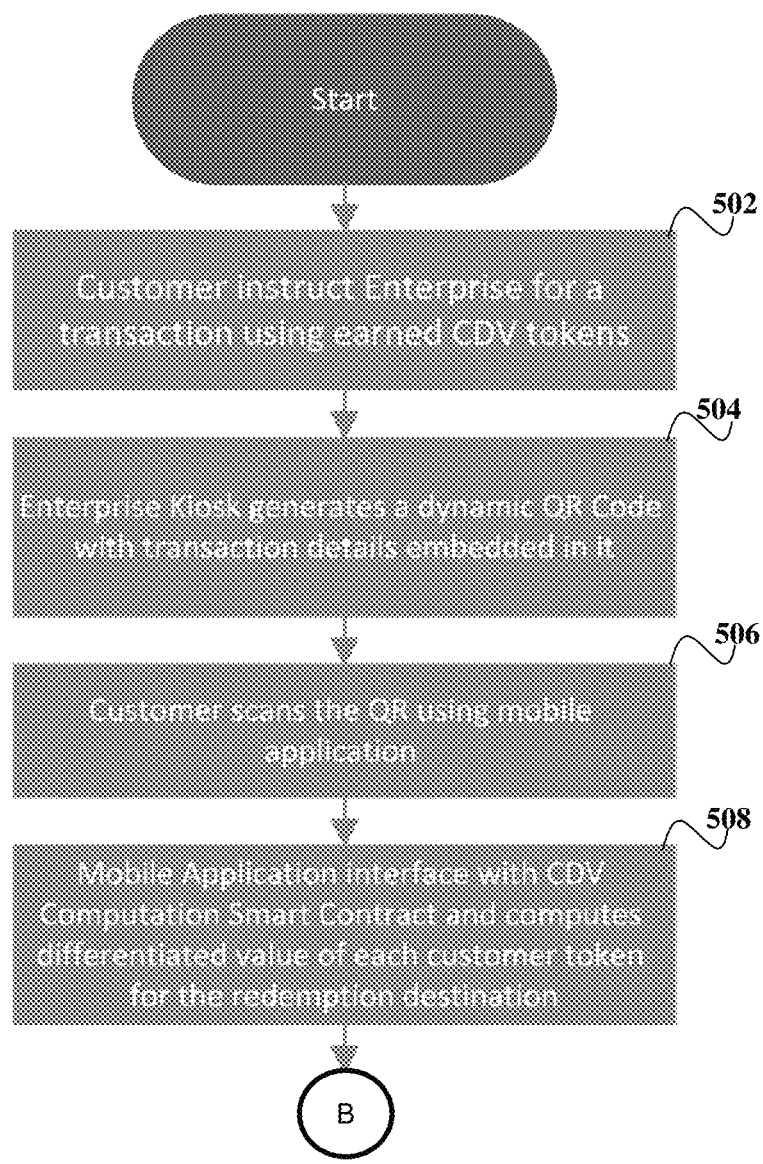
FIGS. 5A and 5B exemplarily illustrate the redeeming of the CDV tokens associated with the decentralized system for crediting and redemption of credit points using scannable code, as an embodiment of the present disclosure.
Figure 5B:
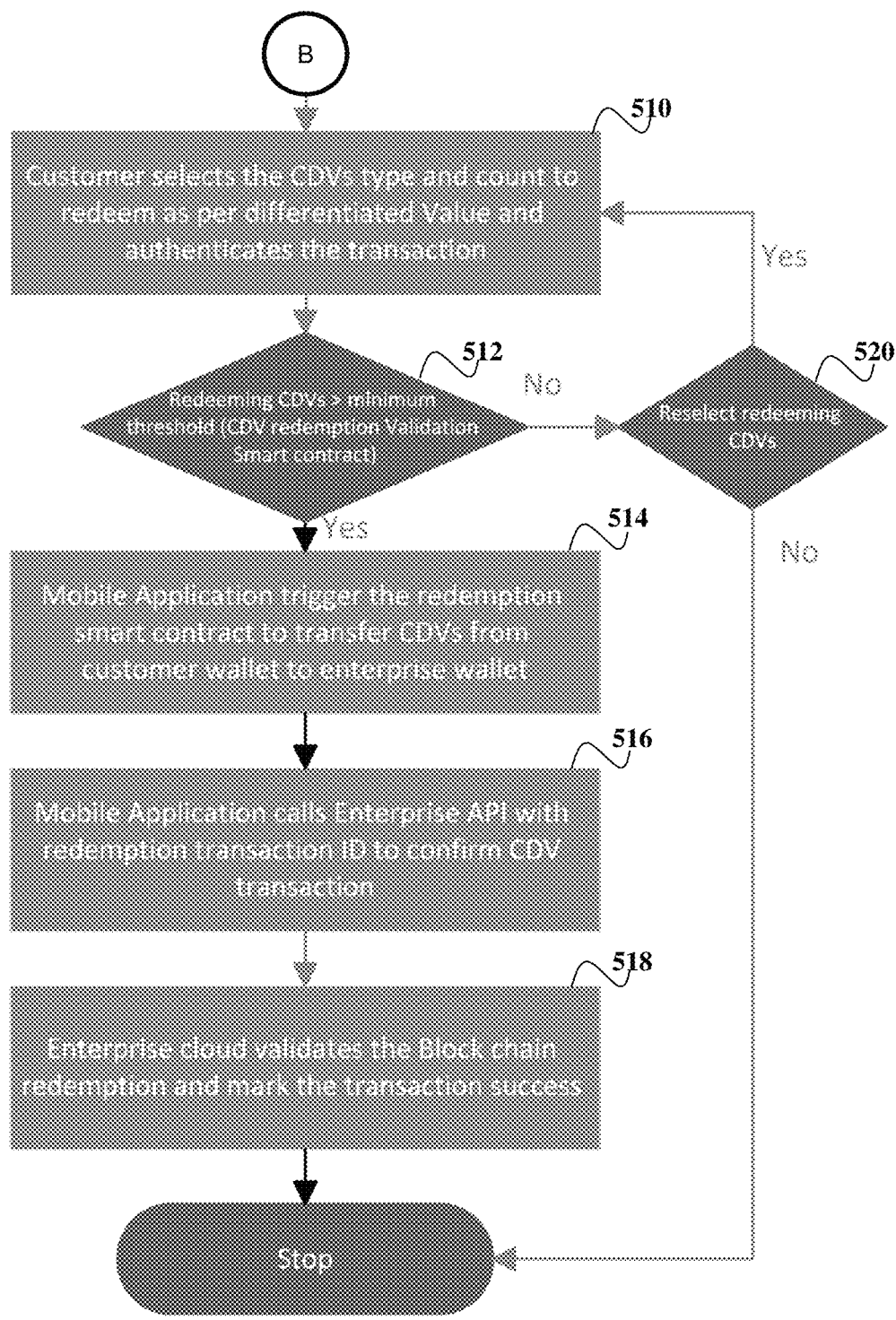

FIGS. 5A and 5B exemplarily illustrate the redeeming of the CDV tokens 112 associated with the decentralized system for crediting and redemption of credit points using scannable code, as an embodiment of the present disclosure. At 502, the customer instructs enterprise 102 for a transaction using earned CDV tokens 112. At 504, the enterprise kiosk 114 generates a dynamic QR Code 124 with transaction details embedded in it. At 506, the customer scans the QR Code 124 using mobile application 120. At 508, the mobile application 120 interfaces with CDV computation smart contract 110 and computes differentiated value of each customer CDV tokens 112 for the redemption destination. At 510, the customer selects the CDVs type and count to redeem as per differentiated value and authenticates the transaction. At 512, a check is performed whether the redeeming CDVs>minimum threshold (CDV redemption validation smart contract). At 514, if check is YES, then the mobile application 120 triggers the redemption smart contract 110 to transfer CDV tokens 112 from the customer wallet 122 to enterprise wallet. At 516, the mobile application 120 calls enterprise API with redemption transaction ID to confirm CDV transaction. At 518, the enterprise cloud 102 validates the block chain redemption and marks the transaction as a "success". In another instance, at 514, if check is NO, then at 520, reselection of redeeming CDV tokens 112 is tried. If its YES, then at 510, the customer again selects the CDVs type and counts to redeem as per differentiated value and authenticates the transaction. If it's NO, and the reselection cannot be done, then the process is stopped.

Operational Aspect: Blockchain as its basic architecture promotes the consortium of organizations to come together and form a decentralized zero-trust platform. As part of our solution, we are recommending a permissioned blockchain as the base platform. The purpose of choosing permissioned blockchain over the public blockchain is more from a cost perspective, as public blockchain levies the 'gas' fees while doing the transactions.

The solution could be deployed in any of the following options:
a) The base decentralized blockchain platform along with the validation nodes could either be provided by the independent solution provider, who can provide this differentiated value solution as a service to various enterprises,
b) The key participating enterprises can form a consortium and each organization can spawn blockchain nodes and form a truly decentralized solution. These consortium members can later onboard other organizations as solution participants or as key consortium members also.

INDUSTRIAL APPLICABILITY

The method proposed has widespread applicability in any scenario where enterprises wish to collaborate to share users' earned credits in a secure manner while retaining control over the use of this.

Some of the common areas where this solution could be used:
1. B2C Industry (Retailers, Hospitality, Airlines, etc.):
   Credit programs are used by
   Enterprises to retain existing customers, encourage repeat transactions, and attract new consumers. Interoperability with differentiated values will help consumers get more value out of the credit program yet helps enterprises to answer cannibalization.
2. Employee Reward Programs: Appreciation, Rewards are commonly used by Employers to appreciate & recognize the exceptional performance of the employees. Existing programs either give a gift or reward which could be used only at limited places that employees may not like or an open voucher that employees may like but does not give a lever to the employer to use for specific objectives. Differentiated value reward programs will help employers to offer more value for the usage which helps employees with certain behavior. E.g., rewards points may have more value for buying books and learning new skills than entertainment options.
3. Educational Institute: A student is expected to earn a certain number of credits to qualify for a degree or certificate. As universities are allowing students to earn a certain number of credits using MOOC courses, or from other universities. A decentralized differentiated value credit system will allow universities to define their rules to convert externally earned credits into suitable credit as per their policies and seamlessly enable students and universities to automate this flow.
4. Sports: A sportsperson or athlete participates in a number of events organized by different organizers like private clubs, state & national level games, school level, etc. A differentiated value credit earning system will provide a central platform to combine the overall performance of athlete in proportionate manner and rank accordingly.

As will be appreciated by one of skill in the art, the present invention may be embodied as a method, system, and apparatus. Accordingly, the present invention may take the form of an entirely hardware embodiment, a software embodiment or an embodiment combining software and hardware aspects.

It will be understood that each block of the block diagrams can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation of the scope of the invention.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

We claim:

1. A decentralized system for crediting and redemption of credit points using scannable codes, wherein the decentralized system comprises:
    at least one processor that operates under control of a stored program comprising a sequence of program instructions to control one or more components, wherein the components comprising:
    a plurality of enterprises that are onboarded onto a decentralized blockchain platform and are provided with credit points that need to be shared with consumers;
    each enterprise registers on the decentralized blockchain platform using a smart contract that includes a set of rules, wherein the smart contract is part of a blockchain of the decentralized blockchain platform, which governs how the credits are monetized across different enterprises, wherein the smart contract facilitates earning and redeeming of the credit points, and enables consumption of the credits across the different enterprises, without any explicit credit points exchange, wherein the smart contract is a combination of instructions and rules defining credit points conversion, wherein each onboarded enterprise defines and changes their conversion rules respectively, wherein one of the enterprises is enabled to define a differentiated value based on strategy, positioning, and mutual agreement with other ones of the enterprises that are onboarded onto the decentralized blockchain platform, and wherein the enterprises define a non-reciprocal conversion rate;
    wherein the user performs one or more transactions with one or more of the enterprises, and in response to the transaction, the processor computes the credit points based on the smart contract between consumer and the enterprise, which is an issuing enterprise, and transfers associated credit tokens to a blockchain account that is generated for the consumer, wherein the credit tokens are redeemable at a redeeming enterprise;
    a mobile device comprising a mobile application that is used by the consumer, wherein the consumer uses the mobile application to authenticate a transaction at the redeeming enterprise, wherein the consumer is enrolled in a credit program; and
    the redeeming enterprise provides a quick reference (QR) code, wherein the consumer scans the QR code using the mobile application and authenticates the transaction, wherein the redemption is exchanged for a differentiated value based on the smart contracts of the issuing enterprise and the redeeming enterprise.

2. The decentralized system as claimed in claim 1, wherein the enterprises mine a pool of associated credit tokens, which are fungible credit tokens to be granted as credit points to the consumers, and the set of rules defined in the smart contract governs how the credits are monetized across the different enterprises.

3. The decentralized system as claimed in claim 2, wherein the credit points are fungible credit tokens that are different from cryptocurrencies, which are exchanged at a fixed price, irrespective of any trading platform or a location of exchange.

4. The decentralized system as claimed in claim 3, wherein value of the fungible credit tokens is determined by the smart contract based on two entities involved in the transaction, wherein the two entities comprising:
    a first entity, which is the issuing enterprise from the plurality of enterprises, which has mined the fungible credit tokens and issued the fungible credit tokens to the consumers, and
    a second entity, which is the redeeming enterprise from the plurality of enterprises, wherein the consumer redeems the fungible credit tokens as credit points.

5. The decentralized system as claimed in claim 1, wherein as a part of the enrolment process of the consumer, a blockchain account is created in the decentralized blockchain platform for the consumer, and public and private keys of their blockchain account is shared with the consumer, wherein the decentralized blockchain platform maintains mapping of a consumer ID that is associated with the blockchain account, with the public key generated based on the consumer account in the blockchain.

6. The decentralized system as claimed in claim 1, wherein when the consumer transacts for credit redemption, the consumer needs to authenticate the transaction using their public and private key for account security using the mobile application.

7. The decentralized system as claimed in claim 1, wherein the redeeming enterprise comprises a kiosk, wherein the kiosk displays the QR code, which is a dynamic QR code, and the consumer scans the dynamic QR code using the mobile application on their mobile device and authenticates the transaction.

8. A method for crediting and redemption of credit points using scannable codes, wherein the method comprises:
    providing at least one processor that operates under control of a stored program comprising a sequence of program instructions to control one or more components, wherein the components comprising:
    onboarding a plurality of enterprises onto a decentralized blockchain platform and are provided with credit points that needs to be shared with consumers;
    registering each enterprise on the decentralized blockchain platform using a smart contract that includes a set of rules, wherein the smart contract is part of a blockchain of the decentralized blockchain platform, which governs how the credits are monetized across different enterprises, wherein the smart contract facilitates earning and redeeming of the credit points, and enables consumption of the credits across the different enterprises, without any explicit credit points exchange, wherein the smart contract is a combination of instructions and rules defining credit points conversion, wherein each onboarded enterprise defines and changes their conversion rules respectively, wherein one of the enterprises is enabled to define a differentiated value based on strategy, positioning, and mutual agreement with other ones of the enterprises that are onboarded onto the decentralized blockchain platform, and wherein the enterprises define a non-reciprocal conversion rate;

the user performing one or more transactions with one or more of the enterprises, and in response to the transaction, the processor computes the credit points based on the smart contract between consumer and the enterprise, which is an issuing enterprise, and transfers associated credit tokens to a blockchain account that is generated for the consumer, wherein the credit tokens are redeemable at a redeeming enterprise;

authenticating a transaction at the redeeming enterprise, by a consumer who uses a mobile device comprising a mobile application, wherein the consumer is enrolled in a credit program; and providing a quick reference (QR) code by the redeeming enterprise to the consumer, wherein the consumer scans the QR code using the mobile application and authenticates the transaction, wherein the redemption is exchanged for a differentiated value based on the smart contracts of the issuing enterprise and the redeeming enterprise.

9. A computer programmed product having a computer-program recorded on a non-transitory computer-readable storage medium and at least one processor that operates under control of a stored program comprising a sequence of program instructions, to execute steps of crediting and redemption of credit points using scannable codes, wherein the steps comprise:

onboard a plurality of enterprises onto a decentralized blockchain platform and are provided with credit points that needs to be shared with consumers;

register each enterprise on the decentralized blockchain platform using a smart contract that includes a set of rules, wherein the smart contract is part of a blockchain of the decentralized blockchain platform, which governs how the credits are monetized across different enterprises, wherein the smart contract facilitates earning and redeeming of the credit points, and enables consumption of the credits across the different enterprises, without any explicit credit points exchange, wherein the smart contract is a combination of instructions and rules defining credit points conversion, wherein each onboarded enterprise defines and changes their conversion rules respectively, wherein one of the enterprises is enabled to define a differentiated value based on strategy, positioning, and mutual agreement with other ones of the enterprises that are onboarded onto the decentralized blockchain platform, and wherein the enterprises define a non-reciprocal conversion rate;

the user performs one or more transactions with one or more of the enterprises, and in response to the transaction, the processor computes the credit points based on the smart contract between consumer and the enterprise, which is an issuing enterprise, and transfers associated credit tokens to a blockchain account that is generated for the consumer, wherein the credit tokens are redeemable at a redeeming enterprise;

authenticate a transaction at the redeeming enterprise, by a consumer who uses a mobile device comprising a mobile application, wherein the consumer is enrolled in a credit program; and provide a quick reference (QR) code by the redeeming enterprise to the consumer, wherein the consumer scans the QR code using the mobile application and authenticates the transaction, wherein the redemption is exchanged for a differentiated value based on the smart contracts of the issuing enterprise and the redeeming enterprise.

* * * * *